United States Patent [19]

Bishop et al.

[11] Patent Number: 4,972,264
[45] Date of Patent: Nov. 20, 1990

[54] METHOD AND APPARATUS FOR VIEWING AN OVERSCANNED IMAGE

[75] Inventors: Mark S. Bishop; Nancy A. Burns; John J. Deacon, all of Austin; Steven C. Penn, Georgetown, all of Tex.

[73] Assignee: International Business Machines Corporation, Armonk, N.Y.

[21] Appl. No.: 368,434

[22] Filed: Jun. 19, 1989

[51] Int. Cl.$^5$ ..................... H04N 5/272; H04N 1/387
[52] U.S. Cl. .................................. 358/183; 358/102; 358/180
[58] Field of Search ................. 358/22, 102, 180, 183, 358/77, 451, 449

[56] References Cited

U.S. PATENT DOCUMENTS

| | | | |
|---|---|---|---|
| 4,772,941 | 9/1988 | Noble | 358/183 |
| 4,774,569 | 9/1988 | Morton et al. | 358/102 |
| 4,779,135 | 10/1988 | Judd | 358/180 |

OTHER PUBLICATIONS

*IBM Technical Disclosure Bulletin*, vol. 30, No. 10, Mar. 1988, Framing Display for an Inexpensive Video Capture System, p. 283; "Increasing Time Resolution of Electron Beam and Photo-Electric Sampling", p. 10, D. R. Grischkowsky and J. M. Halbout.

*Primary Examiner*—Tommy P. Chin
*Attorney, Agent, or Firm*—Thomas E. Tyson

[57] ABSTRACT

A method for viewing a representation of an overscanned captured image on a display that is incapable of displaying the full image as originally captured. The method comprises the steps of (1) digitizing the image to produce a first block of serial data elements where each data element represents at least one picture element of the image, (2) storing a first data block in a data processing memory, (3) computing a second data element block by removing every nth data element from the first data element block, where n is an integer less than the number of first data block elements and said second data block element represents a reduced size image, and (4) displaying the second data element block overlayed upon at least a portion of the digitized image. The invention also includes an apparatus for viewing a representation of an overscanned captured image. The apparatus consists of a camera for digitizing the image, a data processing means including means for storing a first block of data from the digitizing camera representing the captured and digitized image, computing a second data block from a first data block of the digitized image data by removing every nth data element of the first data block, where n is less then the number of elements in the first data block, and a display for accessing the data processor to display the second data block overlayed upon at least a portion of the digitized image.

19 Claims, 9 Drawing Sheets

View reduction of video: ENTER or ESC ends view, <- -> for centering

| Digitize | Edit | Controls | File | Exit | Help | 200 |
|---|---|---|---|---|---|---|

| Status | Image Name | Palette |
|---|---|---|
| Editing | Image_1 | PAL_8514 |
|  |  |  |

240

IDLE — 242

FIG. 4E

METHOD AND APPARATUS FOR VIEWING AN OVERSCANNED IMAGE

TECHNICAL FIELD

This invention relates to processing of digital data representing photographic images, and more particularly to a method and apparatus for displaying overscanned images.

BACKGROUND OF THE INVENTION

Recent advances in the video and computer technology have yielded the capability of converting images of photographic quality into digital data. This digital form of an image is called digitized image. The digitized image can be stored and/or modified by data processing equipment. The digitized image can also be displayed on a video monitor. One problem that is commonly encountered is that the digitized image from the camera cannot be fully displayed on the video monitor. This results from the fact that some video monitors are made to show only part of the image that is "seen" by the video camera. In other words, for the image to be displayed by the video monitor in a manner that fills the video monitor screen, portions of the image originally captured by the camera will not be displayed by the video monitor. The video monitor is "overscanning" the image. The image is, therefore, commonly referred to as the "overscanned" image. However, it is important when digitizing images from a video camera to be able to view the complete image that is being captured.

*IBM Technical Disclosure Bulletin,* Vol. 30, No. 10, March, 1988, page 10 discussed the overscan problem and proposes a solution of image reduction on a dedicated display.

U.S. Pat. No. 4,774,569, entitled "Method for Adaptively Masking Off a Video Window in an Overscanned Image" to Morton et al discloses a method for extracting an image from an overscanned image where the overscanned image includes picture element information that is desired to not be included in the extracted image.

It is the object of the present invention to provide a method and apparatus for displaying an overscanned image on a video monitor together with the image as it would normally appear at least in part.

DISCLOSURE OF THE INVENTION

In accordance with the present invention, a method for viewing a representation of an overscanned captured video image is provided that includes the steps of digitizing the image from a video camera to produce a first block of stream data representing said image where each data element represents one picture element of the image. Second, storing the first data block. Third, producing a second data block by copying said first data block and systematically removing every nth data element, where n is less than the number of data elements in the first data block and said second data block represents a reduced size image. Fourthly, storing said second data block. Lastly, displaying said second data block overlayed upon at least a portion of the digitized image on said display.

In the preferred embodiment, the method includes the digitizing the image from a video camera that produces a full size image represented by a first data block of serial data. In this preferred embodiment, each data element represents a picture element of the digitized image. This first data block is stored. A second data block is produced from the first data block by copying said first data block and systematically removing every fourth data element to produce a second data block representing a 75% reduction of the original image. The second data block is then stored. The second data block is also displayed overlayed upon at least a portion of the digitized image.

One alternative to the preferred embodiment discussed above provides that the digitized image and the second data block are combined to provide a display wherein the second data block image is overlayed upon the digitized image and the reduced size image includes a cursor generated border when it is overlayed for display.

Also, in accordance with the present invention, an apparatus for displaying a representation of an overscanned digitized video image is provided. This apparatus includes an adapter for digitizing an image from a video camera and producing a first block of data representing the image where each data element represents one picture element of the image. A memory for storing the first data block, called video memory. A processor is provided for producing a second data block by copying said first data block from video memory and storing said second data block into video memory while systematically removing every nth data element, where n is an integer less than the number of data elements in the first data block. The second data block represents a reduced size image. A display is connected to the video memory for displaying the second data block overlayed upon the digitized image.

BRIEF DESCRIPTION OF THE DRAWINGS

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

FIG. 4E illustrates the restoration of the display after the operator has ended the viewing of the 75% reduction of the image.

BEST MODE FOR CARRYING OUT THE INVENTION

This invention provides the means for displaying an image where the full image cannot be completely displayed.

Figure 1:
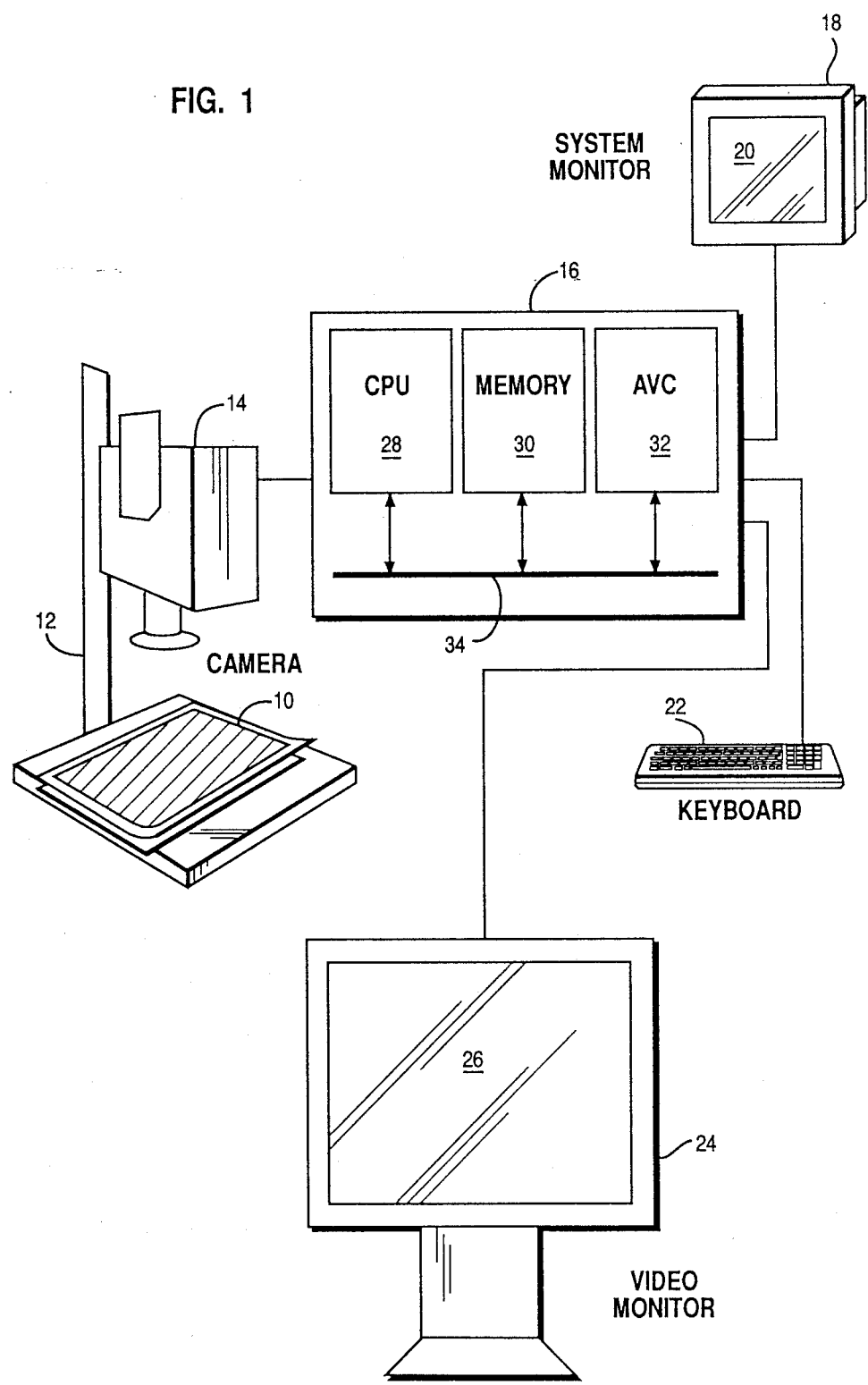
FIG. 1 is a diagram of a video processing system.

FIG. 1 illustrates a video processing system that includes an image 10, such as a picture, that is to be captured (or digitized) from a camera 14. The camera 14 is connected to a support 12. In practice, the camera is adjustable upon the support 12 to vary the field of view relative to the image 10. Therefore, if an operator determines that an insufficient portion of the image is being captured, the operator can move the camera 14 further from the image 12, or adjust the lens, in order that the field of view of the camera can more completely capture the image 10. Conversely, if the camera 14 is too far from the image 10, the field of view will include more information than just the specific image. This would result in a reduction of resolution of the image data that is captured. Therefore, the operator would want to move the camera 14 closer to the image 10 such that the field of view would be filled with information from the image 10. Thus, it is important that the camera 14 be properly positioned relative to the image 10 so that the image can be completely captured in a manner maximizing the resolution of the image.

Camera 14 is connected to a data processing system 16. In the preferred embodiment the camera 14 is a panasonic video camera and the data processing system 16 is a PS/2 Model 80. The data processing system includes a central processing unit 28 memory 30 and an audio/visual card 32 that are all connected to a bus 34. In the preferred embodiment, the bus 34 is a microchannel bus. The data processing system is connected to system monitor 18, keyboard 22 and display 24. In the preferred embodiment, the video monitor 24 is driven directly by the audio/visual card (hereinafter "AVC") directly. In practice, the operator receives status and information from the video editing software from system monitor 18 on screen 20 and provides inputs to the video editing software through keyboard 22. Image data being edited is displayed on display 24 within screen 26.

Figure 2:
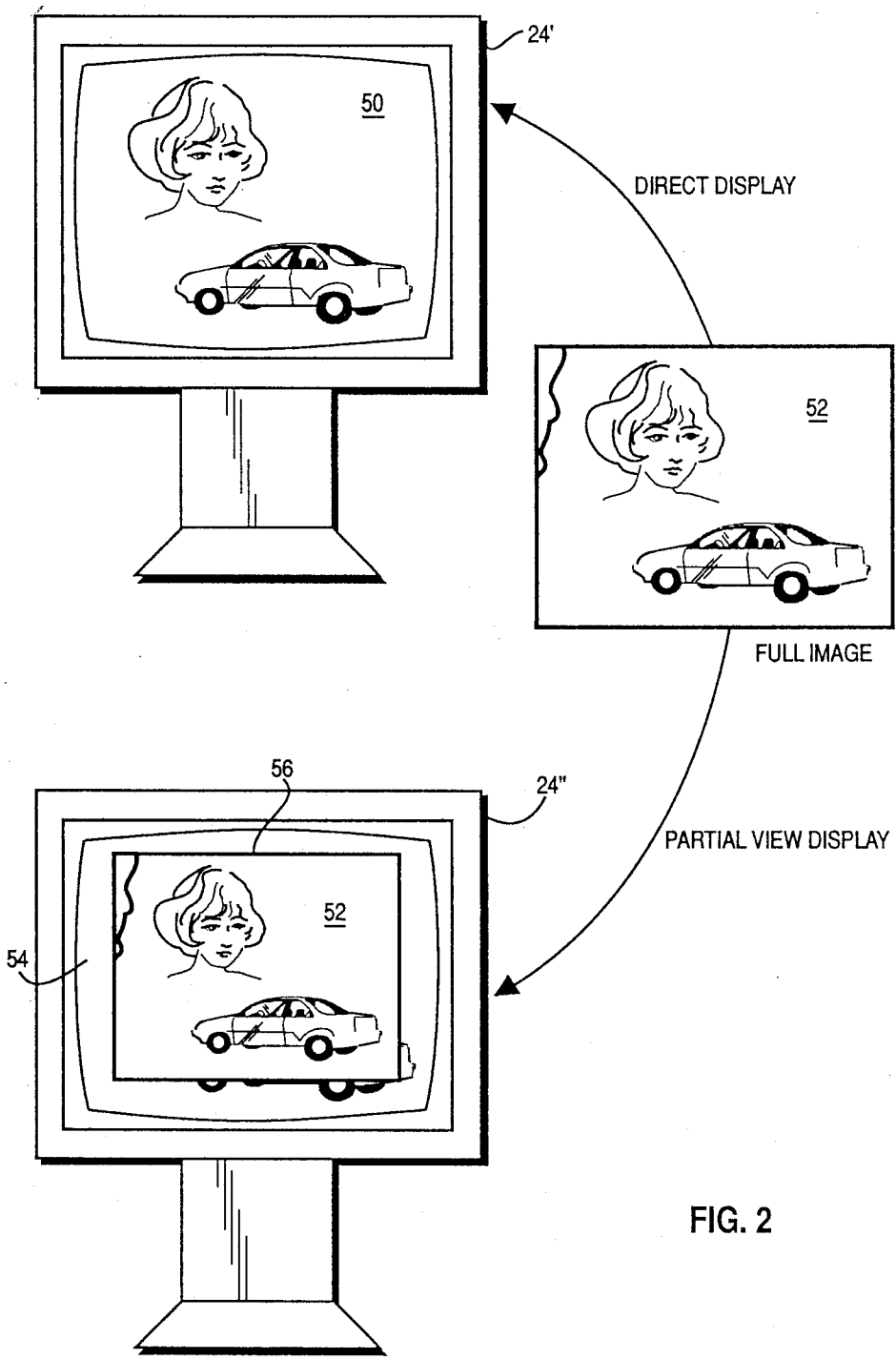
FIG. 2 is an illustration of the display first displaying the unmodified image and second displaying the overlay of the full image after modification.

FIG. 2 illustrates the operation of the present invention. Video monitor 24 prime illustrates an image 50. In operation, the picture tube of the display of 24 prime is incapable of displaying the full image captured by camera 14 in a manner illustrating the full resolution of the image. This is because the video monitor 24 is an overscanning monitor. In FIG. 2, the full image is illustrated by image 52. In order that the operator correctly position camera 14 relative to image 10 (See FIG. 1), the operator must see the full image. The present invention provides the solution by providing an overlayed image 52 upon the original sized overscanned image 50 on screen 54. In this manner the operator now sees the full image that was captured by the camera and also has the capability to see the image that will be displayed by the video monitor. For the convenience of the operator, a border 56 is provided around the full image 52.

The video editing software resident in the memory 30 (FIG. 1) of the data processor 16 interacts with the AVC 32 to both receive the image from the camera 14 and to provide the image display to the video monitor 24. The data processing system 16 also provides the information to the operator via the system monitor 18 and receives commands via the keyboard 22 as previously discussed.

Figure 3:
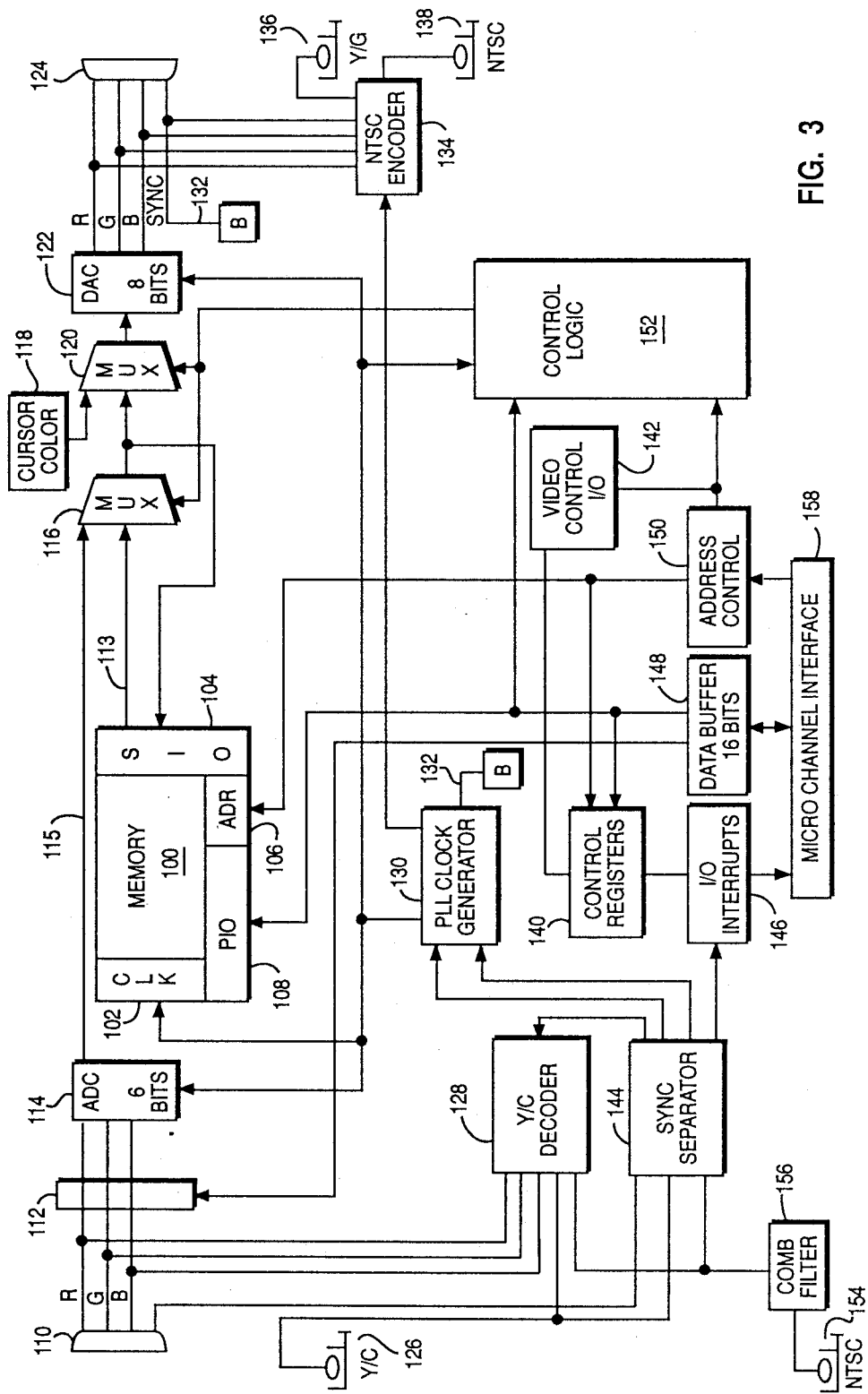
FIG. 3 is a block diagram of the audio/visual card.

FIG. 3 illustrates a block diagram of the AVC 32. In its simplest form, the AVC 32 receives an RGB signal through receivers 110. The analog RGB signals are provided to an analog-to-digital converter 114, which provides a signal through multiplexer 116 into a port 104 of memory 100. Note that a synchronization signal from receiver 110 is also provided to a synchronization separator circuit 144. The synchronization separator circuit 144 then provides a synchronization input to the phase lock loop clock generator 130 and the input/output interrupt circuitry 146. The AVC may receive the encoded signals Y/C of NTSC composite video. The Y/C signal is provided to the Y/C decoder circuit 128 and the synchronization separator circuit 144. This information is converted into RGB and provided to the analog-to-digital convertor circuit as shown. Additionally, the NTSC composite video signal is received on line 144 and provided to a cone filter 156. This signal is also provided to both the Y/C decoder circuit 128 and the synchronization separator circuit 144 to provide the RGB information. It should be understood that the Y/C signal and the NTSC composite video signal are merely alternative input signals to provide the video information to the AVC 32. The digitized video information that is stored in memory 100 is operated on by the CPU 28 through the microchannel interface 158, the address control logic 150, the data buffer circuit 148, which are both connected to the address port 106 and the programmed I/0 port 108 of memory 100 respectively. Both the address and control information from circuits 150 and 148 are provided to the control registers 140. Video information contained in memory 100 can be output through multiplexer 116 and again through multiplexer 120 to a digital-to-analog converter circuit 122 to provide analog RGB information. Again, the RGB information is provided on connector 124 or can be converted with the NTSC encoder circuit 134 to provide Y/C video information on line 136 or NTSC composite video information on line 138. The phase lock loop clock generator circuit 130 provides a synchronization signal to the connector 124 on line 132. The generator circuit 130 also provides a 3.58 megahertz signal to the NTSC encoder circuit 134 in the preferred embodiment. Black level and white level control information is provided to circuit 112. The control logic 152 controls the multiplexer 116 and 120, which determines the source of each picture element to DAC 122. This is how the overlay function is performed.

The control logic 152 also receives a clock signal from the phase lock loop clock generator 130.

By using the AVC 32, the video editing software provides the capability to digitize an image from camera 14, store the image data in video memory of the AVC 32, modify data in video memory, and display the modified image on the video monitor 24.

Figure 4A:
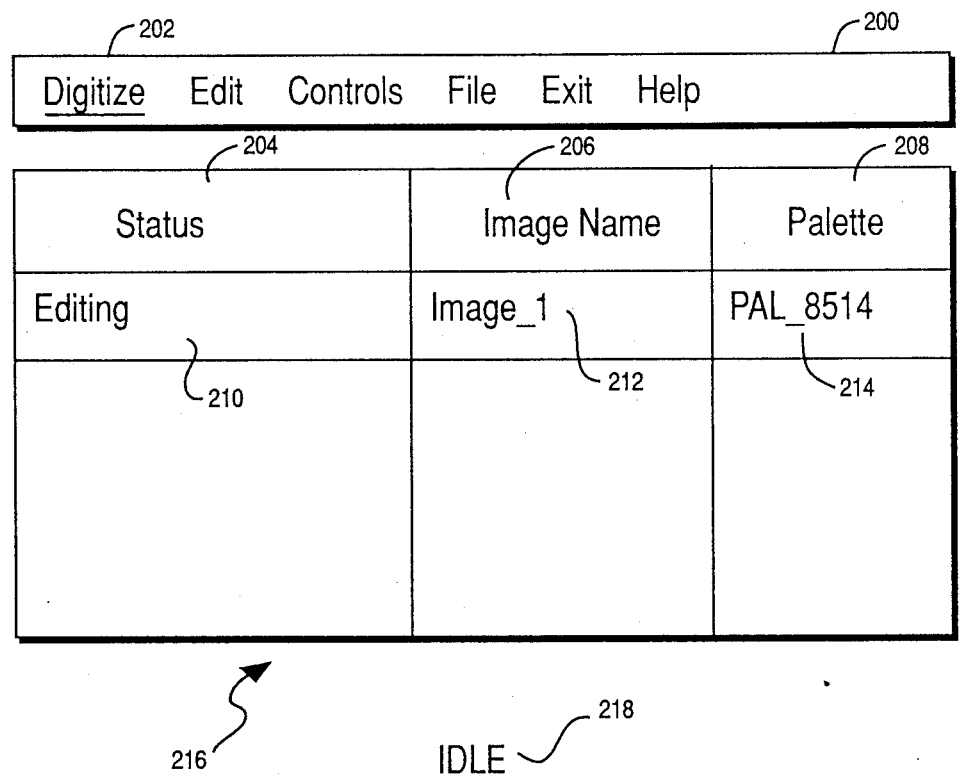
FIG. 4A is a representation of the system monitor illustrating information presented to an operator when the operator is initiating the overscanned image display method by selecting the digitize command.
Figure 4B:
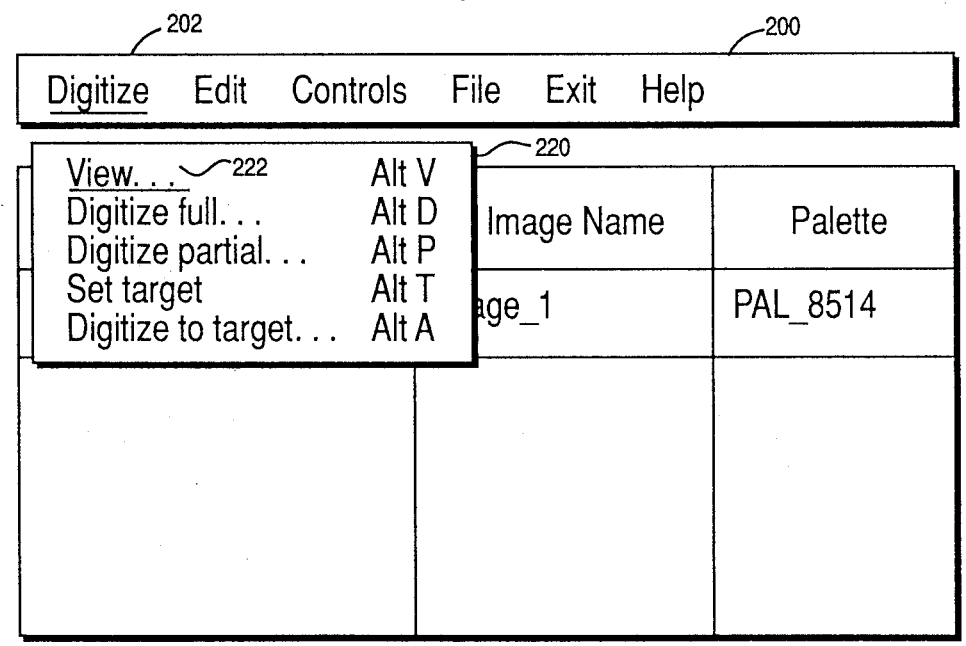
FIG. 4B is an illustration of the system monitor showing the response of the system to the operator after the digitize command has been executed and illustrating the selection of the view subcommand.
Figure 4C:
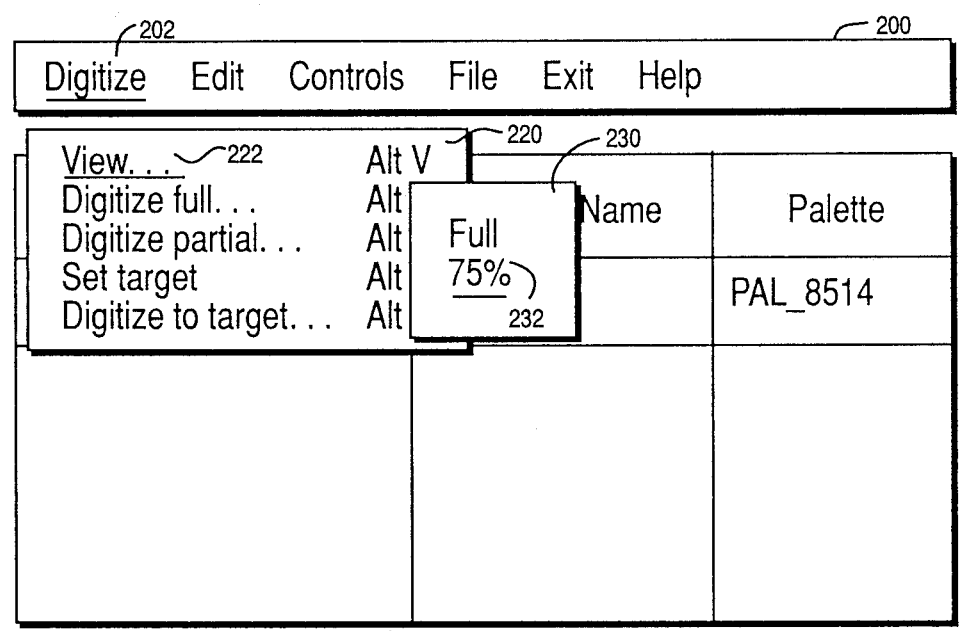
FIG. 4C is an illustration of the system monitor showing the response of the system to the selection of the view subcommand and the selection of the 75% reduction choice.
Figure 4D:
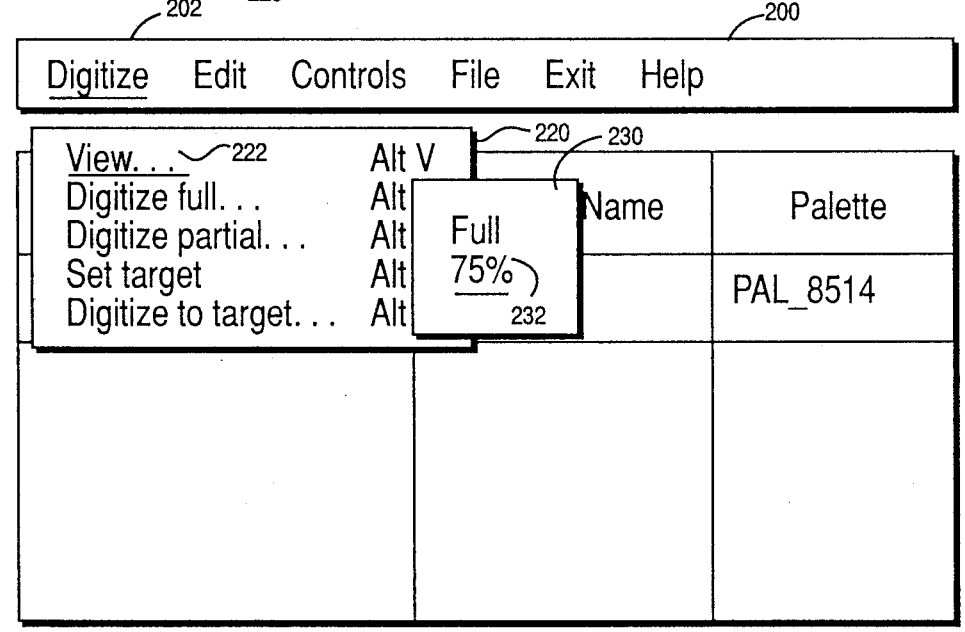
FIG. 4D illustrates the monitor showing the response of the system to the selection of the 75% choice.

During the operation of the video editing sequence, the operator will interface to the program through the system monitor 18 and keyboard 22. FIGS. 4A4E illustrate the contents of the system monitor 18 screen 20 during the editing process, and, more specifically, during the resizing of a full image for display on display screen 26 of the video monitor 24. FIG. 4A illustrates what the operator sees on screen 20 of system monitor 18 when this procedure is started. The operator sees an image 216 consisting of a command line 200 with status information 204, an image name 206, and a palette 208. The operating status of the software is illustrated by the idle statement 218. In this example, the operator has selected the digitize command 202, the status of the program is editing 210 on Image 1 212 with palette data Pal 8514. In FIG. 4-B, in response to the selection of the digitize command 202, window 220 appears with a list of subcommands. In this example, the operator has selected subcommand 222. It should be understood that selection of commands and subcommands can be performed by either the use of cursor keys, a mouse, or any other manner indicated to the operator (such as selection of the ALT V keys). In FIG. 4C, the screen appears as image 228 that includes a subwindow 230 illustrating the operator has selected choice 232 of a 75% view of the digitized image.

In response to this selection, the operator sees the program response of line 234 appearing on the system monitor screen 20 of monitor 18. At the same time, viewing the image on the display video monitor 24, the operator would view an image representation 54 (See FIG. 2) illustrating a 75% reduction of the full image overlayed on the partial image originally displayed by the video monitor 24.

The operator can end the viewing by pressing either the ENTER or the ESC key. In response, the operator would see screen 240 of FIG. 4E together with the idle status 242.

It should be understood that when the 75% reduction image is being viewed, this is a constantly captured image. In other words, the camera is continuously providing data to the AVC 32 and the operator is free to adjust the camera on the frame 12 in order to determine the image that is being captured in the camera 14 field of view.

Figure 5:
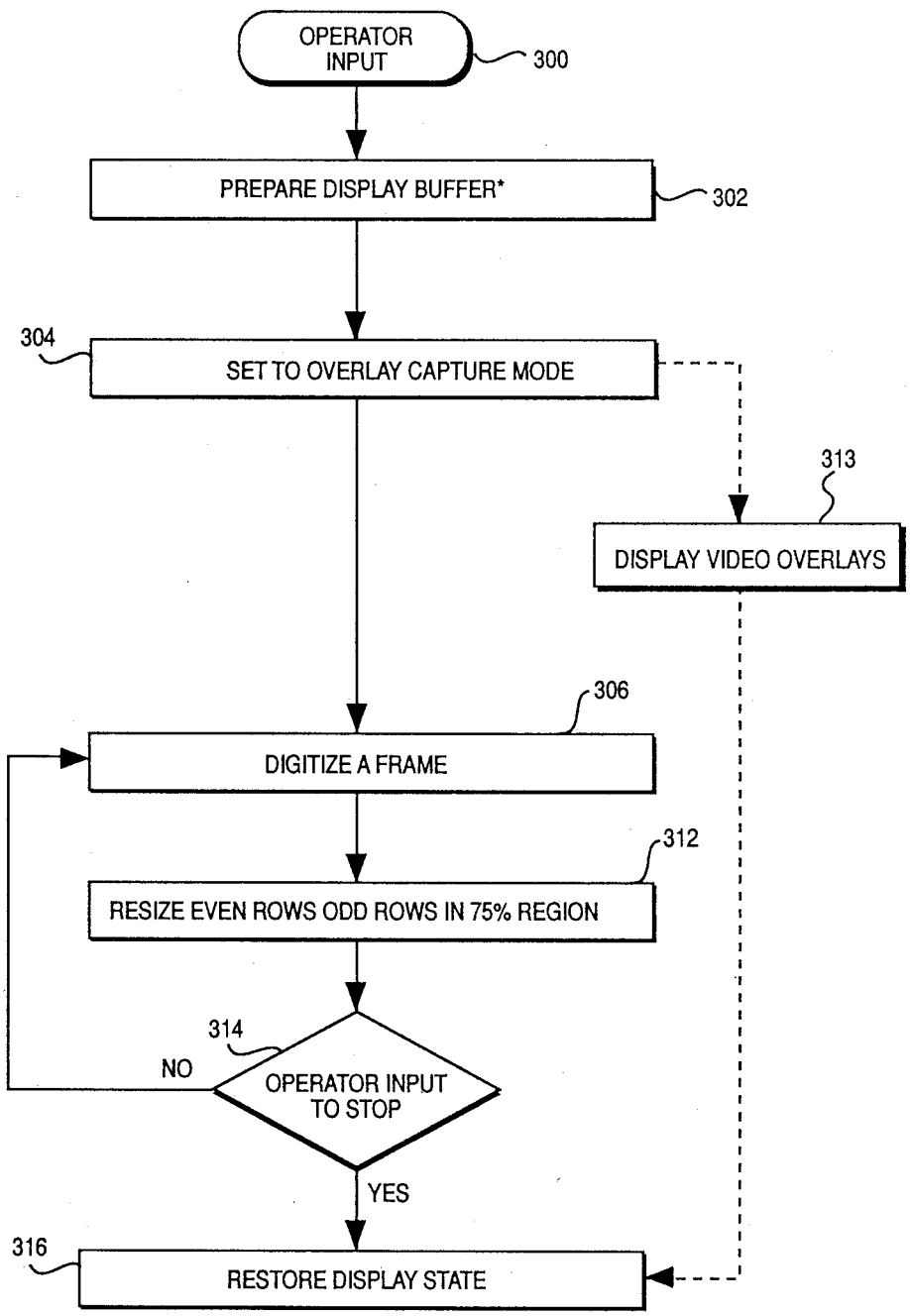
FIG. 5 is a flow chart illustrating the program that provides the reduced 75% overscanned image region representation for display.

FIG. 5 illustrates the operation of the video editing software that performs the full image reduction for display process. The software receives the operator inputs in step 300. This consists of the selection of the digitize command, the view subcommand and the 75% choice as illustrated in FIGS. 4A–4E. Upon receiving this operator input, the software prepares the display buffer (it should be understood that the video display is displaying information in an interlaced fashion). The display of a video screen of a video monitor consists of a series of scan lines positioned adjacent to each other. The display works by first displaying all even scan lines and then all odd scan lines in a continuously alternating fashion.

Figure 7A:
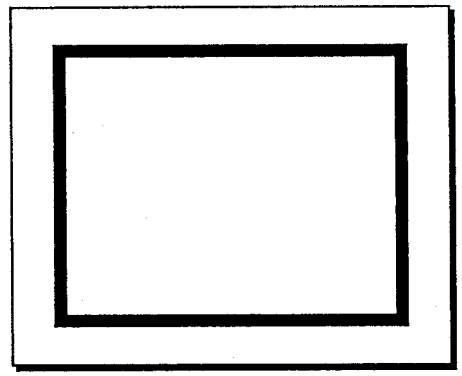
FIG. 7A is a diagram illustrating the cursor overlay pattern used to show the border around the reduced 75% region.
Figure 7B:
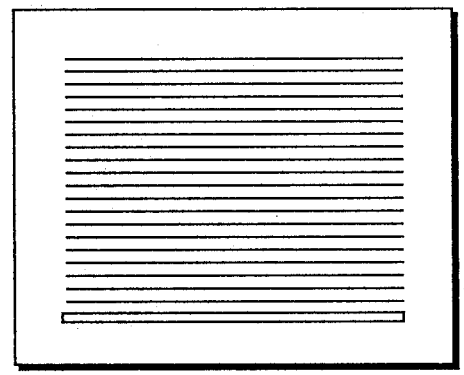
FIG. 7B is a diagram illustrating the cursor overlay pattern used to hide the view of the digitized scan lines that fall on the even rows in the reduced 75% region.

In preparing the display buffer, step 302, the software sets up the overlay planes. The cursor overlay is set to a pattern shown in FIG. 7A and FIG. 7B. The rows shown in FIG. 7B are the even rows in the 75% region. The video overlay is set to a pattern shown in FIG. 7C which are odd rows in the 75% region. When the overlay mode is on, step 304, the video monitor display 20 then shows the cursor color from register 118 (FIG. 3) in a pattern that is in FIG. 7A and 7B and the video memory 100 from line 113 in the odd rows as shown by the pattern in FIG. 7C. The rest of the display shows the "live" image from line 115. This overlay control logic is done in step 313. This function is performed by the control logic block 152 of FIG. 3.

Figure 6:
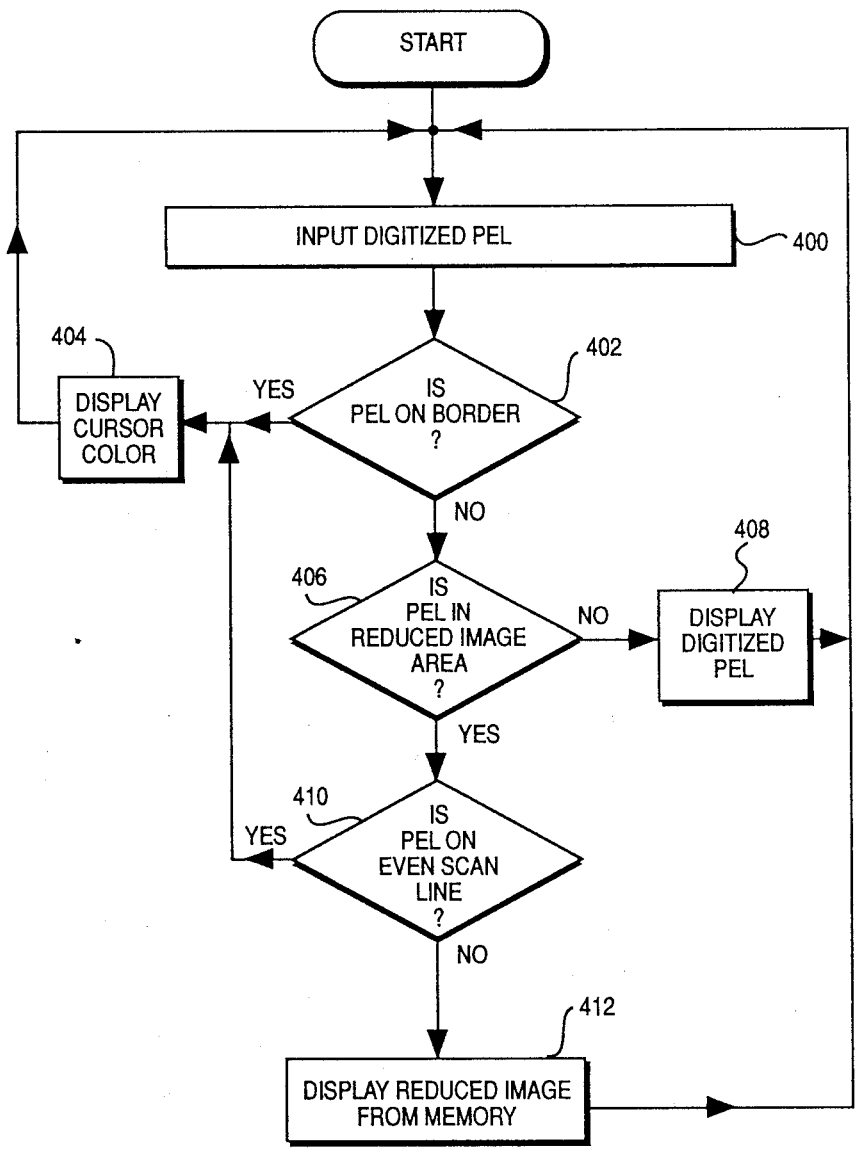
FIG. 6 is a flow chart illustrating the function of selecting the display source of each picture element.

Step 313 displays the image as illustrated as image 24 in FIG. 2. FIG. 6 illustrates the flow chart of the overlay display function of step 313.

Step 400 addresses the overlay control information for a data element ( also referred to as picture element or pel or pixel). Step 402 determines if the data element is in the border region as illustrated in FIG. 7A. If it is, then the cursor color is displayed, step 404. Otherwise, it is determined if the data element to be displayed is in the reduce 75% region, step 406. If it is not, then the digitized data element from line 115 (FIG. 3) is displayed, step 408. Step 410 determines if the data element is on an even scan line. If it is, then the cursor color is displayed, step 404. Otherwise, in step 412, the data element from the memory 100 representing the reduced image is displayed.

In step 306, a frame from the video camera is digitized. The digitized region is the region not falling on the pattern in FIG. 7C. Therefore, all rows are digitized with the exception of the center portion of some of the odd rows in the center. Every even row, however, is whole.

Figure 7C:
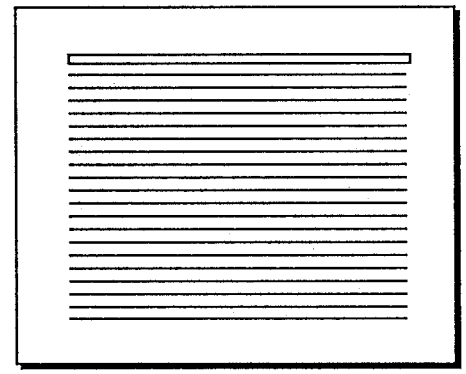
FIG. 7C is a diagram illustrating the video overlay pattern which represent the odd rows in the reduced 75% region that shows the reduced image.

In step 312, the digitized image in the even rows are reduced to the odd rows in the 75% shown in FIG. 7C. This is done by copying a portion of every three of four even rows to an odd row in the 75% region. The portion of each row copied is every 3 data elements of each four data elements in the digitized row. This reduces the row to ¾th the digitized row width. The reduced image will then be in the video overlay plane shown in FIG. 7C. The cursor overlay region shown in FIG. 7B hides a portion of the digitized even row that falls in the 75% region. This prevents the interference of the digitized rows with the view of the 75% region and also reduces the perception of flickering in the 75% region.

Steps 306, 312 and 313 continue to repeat until an operator input occurs. If the input is to stop, step 316 is done. Step 316 restores the overlay planes, mode, and video memory as it was at step 300.

Therefore, the operator, by continuously monitoring the representation of the full image in its reduced form on the display video monitor 24, can position camera 14 relative to the image 10 to capture the desired image information.

Although the invention has been described with reference to this specific embodiment, this description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments as fall within the true scope of the invention.

We claim:

1. A method for viewing a representation of an overscanned captured image on a display, the method comprising the steps of:
   (1) digitizing the image to produce a first block of serial data elements, each data element representing at least one picture element of said image;
   (2) storing said first block in a data processor memory;

(3) computing a second data element block by removing from the first block every nth data element, where n is an integer less than the number of first data block elements, said second data element block representing a reduced size image; and (4) displaying said second data element block overlayed upon at least a portion of the digitized image.

2. A method according to claim 1 wherein step (3) includes the steps of:

(3a) determining a number of scan lines of the image in said first block; and (3b) removing from the first block every mth scan line in computing said second block where m is an integer less than the number of scan lines in said image.

3. A method according to claim 2 wherein m and n are equal.

4. An apparatus of viewing a representation of an overscanned captured image on a display, the apparatus comprising:

means for digitizing the image to produce a first block of serial data elements, each data element representing at least one picture element of said image;

means connected to said digitizing means for storing said first block in a data processor memory;

means connected to said data processor memory for computing a second data element block by removing from the first block every nth data element, where n is an integer less than the number of first data block elements, said second data element block representing a reduced size image; and means connected to said computing means for displaying said second data element block overlayed upon at least a portion of the digitized image.

5. An apparatus according to claim 4 wherein said computing means further includes means for determining a number of scan lines of the image in said first block and means connected to said determining means for removing from the first block every mth scan line in computing said second block where m is an integer less than the number of scan lines in said image.

6. An apparatus according to claim 5 wherein m and n are equal.

7. A method for viewing a representation of a captured image on a display incapable of displaying the full image as captured, said method comprising the steps (1) digitizing the image to produce a first block of data elements representing J scan lines of K picture elements per scan line of the image;

(2) storing said first block in a data processing memory;

(3) computing a second block of data elements by removing from the first block every mth scan line, where m is less than J, and removing from the first block every nth picture element where n is less than K, said second data block representing a reduced size image; and (4) displaying said second data block on a display having a resolution of at least $(J-J/m)$ scan lines of at least $(K-K/n)$ picture elements per scan line overlayed upon at least a portion of the digitized image.

8. A method according to claim 7 wherein m and n are equal.

9. A method for viewing a representation of a captured image on a display incapable of displaying the full image as captured, said method comprising the steps of:

(1) digitizing the image to produce a first block of data elements representing J scan lines of K picture elements per scan line of the image;

(2) storing said first block in a data processing memory;

(3) computing a second block of data elements by removing from the first block every mth scan line, where m is less than J, and removing from the first block every nth picture element where n is less than K, said second data block representing a reduced size image; and (4) displaying said second data block image on a display having a resolution of at least $(J-J/m)$ scan lines of at least $(K-K/n)$ picture elements per scan line overlayed upon said digitized image and wherein a plurality of interleaved scan lines representing the reduced size image will not be displayed.

10. A method according to claim 9 wherein step (4) includes the step of computing border image data between said second data block image overlayed upon said digitized image.

11. A method according to claim 10 further including the step of displaying commands to an operator for steps (1) through (4).

12. An apparatus for viewing a representation of a captured image on a display incapable of displaying the full image as captured comprising:

camera means for digitizing the image to produce a first block of data elements representing J scan lines of K picture elements per scan line of the image;

data processing means connected to said camera means and including means for storing said first block in a data processing memory;

computing a second block of data elements by removing from the first block every mth scan line, where m is less than J, and removing from the first block every nth picture element where n is less than K, said second data block representing a reduced size image; and said display including means for displaying said second data block image overlayed upon at least a portion of said digitized image on a display having a resolution of at least $(J-J/m)$ scan lines of at least $(K-K/n)$ picture elements per scan line and wherein a plurality of interleaved scan lines representing the reduced size image will not be displayed.

13. An apparatus according to claim 12 wherein said data processing means further includes means for computing border image data between said second data block image overlayed upon said digitized image.

14. An apparatus according to claim 13 said data processing means further includes means for displaying commands to an operator.

15. A method for viewing a representation of an overscanned captured image on a display, the method comprising the steps of:

(1) continuously digitizing the image to continually produce a first block of serial data elements, each data element representing at least one picture element of said image;

(2) continually storing said first block in a data processor memory;

(3) continually computing a second data element block by removing from the first block every nth data element, where n is an integer less than the number of first data block elements, said second data element block representing a reduced size image;

(4) continually storing said second data block in a protected area of the data processor memory unavailable for the storage of said first data block; and (5) displaying each of said second data element blocks overlayed upon at least a portion of said digitized image.

16. A method according to claim 15 wherein step (3) includes the steps of:

(3a) determining a number of scan lines of the image in said first block; and (3b) removing from the first block every mth scan line in computing said second block where m is an integer less than the number of scan lines in said image.

17. A method for viewing a representation of an overscanned captured image on a display, the method comprising the steps of:

(1) continuously digitizing the image to continually produce a first block of serial data elements, each data element representing at least one picture element of said image;

(2) continually storing said first block in a data processor memory;

(3) continually computing a second data element block by removing from the first block every nth data element, where n is an integer less than the number of first data block elements, said second data element block representing a reduced size image;

(4) continually storing said second data block in a protected area of the data processor memory unavailable for the storage of said first data block; and (5) displaying each of said second data element blocks overlayed upon at least a portion of said digitized image.

18. A method according to claim 17 wherein step (3) includes the step of computing border image data between said second data block image overlayed upon said digitized image.

19. A method according to claim 18 further including the step of displaying commands to an operator for steps (1) through (5).

* * * * *